US012802445B2

(12) United States Patent
Long et al.

(10) Patent No.: US 12,802,445 B2
(45) Date of Patent: Nov. 17, 2026

(54) METHOD AND APPARATUS FOR SELECTING COVER OF VIDEO, COMPUTER DEVICE, AND STORAGE MEDIUM

(71) Applicant: ARASHI VISION INC., Shenzhen (CN)

(72) Inventors: Liangqu Long, Shenzhen (CN); Bolin Chen, Shenzhen (CN)

(73) Assignee: ARASHI VISION INC., Shenzhen (CN)

( * ) Notice: Subject to any disclaimer, the term of this patent is extended or adjusted under 35 U.S.C. 154(b) by 452 days.

(21) Appl. No.: 18/284,106

(22) PCT Filed: Mar. 29, 2022

(86) PCT No.: PCT/CN2022/083567
§ 371 (c)(1),
(2) Date: Jan. 4, 2024

(87) PCT Pub. No.: WO2022/206729
PCT Pub. Date: Oct. 6, 2022

(65) Prior Publication Data

US 2024/0153271 A1 May 9, 2024

(30) Foreign Application Priority Data

Apr. 1, 2021 (CN) ......................... 202110355058.8

(51) Int. Cl.
*G06V 20/40* (2022.01)
*G06T 7/70* (2017.01)
(Continued)

(52) U.S. Cl.
CPC ................ *G06V 20/46* (2022.01); *G06T 7/70* (2017.01); *G06V 10/56* (2022.01); *G06V 10/60* (2022.01); *G06V 10/761* (2022.01)

(58) Field of Classification Search
None
See application file for complete search history.

(56) References Cited

U.S. PATENT DOCUMENTS

2022/0147741 A1* 5/2022 Wang .................... G06F 16/739

FOREIGN PATENT DOCUMENTS

CN 110399848 A * 11/2019 ............. G06F 18/22
CN 111062930 A 4/2020
(Continued)

OTHER PUBLICATIONS

English translation of CN-110399848-A. (Year: 2019).*

*Primary Examiner* — Vincent Rudolph
(74) *Attorney, Agent, or Firm* — BAYES PLLC

(57) ABSTRACT

The present application relates to a method and apparatus for selecting a cover of a video, a computer device and a storage medium. The method comprises: acquiring video data for which a cover is to be selected, the video data comprising a plurality of video frames; performing quality quantization processing on each video frame, and obtaining quality quantization data of each video frame, the quality quantization data comprising at least one among an imaging quality quantization value and a composition quality quantization value; and selecting a target video frame from the video data according to the quality quantization data of each video frame, and generating a cover of the video data on the basis of the target video frame. By using the described method, a means of selecting a cover is no longer lacks variety, and the flexibility selecting a cover is improved.

17 Claims, 7 Drawing Sheets

(51) Int. Cl.

| | |
|---|---|
| ***G06V 10/56*** | (2022.01) |
| ***G06V 10/60*** | (2022.01) |
| ***G06V 10/74*** | (2022.01) |

(56) References Cited

FOREIGN PATENT DOCUMENTS

CN 111327945 B * 3/2021 ........... G06V 10/761
WO WO-2021004247 A1 * 1/2021 ......... H04N 21/4665

* cited by examiner

METHOD AND APPARATUS FOR SELECTING COVER OF VIDEO, COMPUTER DEVICE, AND STORAGE MEDIUM

TECHNICAL FIELD OF THE INVENTION

The present application relates to the field of computer technology, and in particular, relates to a video cover selecting method and apparatus, a computer device and a storage medium.

BACKGROUND OF THE INVENTION

With the rapid development of information technology and the popularity of intelligent terminals, more and more video applications have emerged, and users can watch videos through the video applications installed on the terminals.

At present, each video in a video application has a corresponding cover, and a wonderful cover can often attract users' attention and gain users' favor, thus winning more attention for the video. In the related art, the first video frame in the video is usually directly used as the cover of the video data.

However, the above-mentioned cover selecting method is relatively simple and is less flexible in cover selection.

SUMMARY OF THE INVENTION

In a first aspect, a method for selecting a video cover is provided, and the method includes the following steps: acquiring a video data with un-selected cover, the video data including multiple video frames; performing quality quantization processing on each of the video frames to obtain quality quantization data of each video frame, the quality quantization data including at least one of an imaging quality quantization value and a composition quality quantization value; selecting a target video frame from the video data according to the quality quantization data of each of the video frames, and generating a cover of the video data based on the target video frame.

In one embodiment, the step of performing quality quantization processing on each of the video frames to obtain quality quantization data of each video frame includes: inputting each of the video frames into a pre-trained imaging quality prediction model to obtain the imaging quality quantization value of each video frame, the imaging quality quantization value including at least one of a brightness quality quantization value, a definition quality quantization value, a contrast quality quantization value, a colorfulness quantization value and an aesthetic index quantization value.

In one embodiment, the step of performing quality quantization processing on each of the video frames to obtain quality quantization data of each video frames includes: inputting each of the video frames into a pre-trained target detection model to obtain an output result; when the output result includes position information in the video frame of at least one target object in the video frame, obtaining the composition quality quantization value of the video frame according to the position information.

In one embodiment, the step of obtaining the composition quality quantization value of the video frame according to the position information includes: obtaining position coordinates of a center point of the video frame; obtaining a target distance between the target object and the center point according to the position information and the position coordinates of the center point, and obtaining the composition quality quantization value according to the target distance.

In one embodiment, the step of obtaining a target distance between the target object and the center point according to the position information and the position coordinates of the center point includes: obtaining an initial distance between the target object and the center point according to the position information and the position coordinates of the center point; multiplying the initial distance by a first weight to obtain a first distance when the initial distance is greater than a preset distance threshold, and taking the first distance as the target distance; multiplying the initial distance by a second weight to obtain a second distance when the initial distance is less than or equal to the preset distance threshold, and taking the second distance as the target distance, wherein the first weight is greater than the second weight.

In one embodiment, the aforesaid method further includes the step of: taking the composition quality quantization value of the video frame as a preset composition quality quantization value when the output result excludes the position information of the target object, wherein the preset composition quality quantization value is related to the composition quality quantization value of at least one video frame including the target object in the video data.

In one embodiment, the step of selecting the cover of the video data based on the target video frame includes: when the target video frame is a two-dimensional image, clipping the target video frame according to the position in the target video frame of the target object in the target video frame; and taking the clipped target video frame as the cover of the video data.

In one embodiment, the step of selecting the cover of the video data based on the target video frame includes the step of: when the target video frame is a panoramic image, rendering the target video frame according to a preset rendering mode and taking the rendered target video frame as the cover of the video data.

In one embodiment, the quality quantization data includes an imaging quality quantization value and a composition quality quantization value, and the step of selecting a target video frame from the video data according to the quality quantization data of each of the video frames includes: calculating a difference between the imaging quality quantization value and the composition quality quantization value of the video frame, and taking the difference as a comprehensive quality quantization value of the video frame; and taking the video frame with the largest comprehensive quality quantization value among the video frames as the target video frame.

In a second aspect, a video cover selecting apparatus is provided, which includes: an acquisition module, being configured to acquire video data with un-selected cover, the video data including multiple video frames; a quality quantization processing module, being configured to perform quality quantization processing on each of the video frames to obtain quality quantization data of the video frames, the quality quantization data including at least one of an imaging quality quantization value and a composition quality quantization value; a selecting module, being configured to select a target video frame from the video data according to the quality quantization data of each of the video frames, and generating the cover of the video data based on the target video frame.

In one embodiment, the aforesaid quality quantization processing module is specifically configured to: input each of video frame into a pre-trained imaging quality prediction model to obtain the imaging quality quantization value of each video frame, the imaging quality quantization value including at least one of a brightness quality quantization value, a definition quality quantization value, a contrast quality quantization value, a colorfulness quantization value and an aesthetic index quantization value.

In one embodiment, the aforesaid quality quantization processing module is specifically configured to: input each of the video frames into a pre-trained target detection model to obtain an output result; when the output result includes position information in the video frame of at least one target object in the video frame, obtaining the composition quality quantization value of the video frame according to the position information.

In one embodiment, the aforesaid quality quantization processing module is specifically configured to: obtain position coordinates of a center point of the video frame; a target distance between the target object and the center point according to the position information and the position coordinates of the center point, and obtain the composition quality quantization value according to the target distance.

In one embodiment, the aforesaid quality quantization processing module is specifically configured to: obtain an initial distance between the target object and the center point according to the position information and the position coordinates of the center point; multiply the initial distance by a first weight to obtain a first distance when the initial distance is greater than a preset distance threshold, and take the first distance as the target distance; multiply the initial distance by a second weight to obtain a second distance when the initial distance is less than or equal to the preset distance threshold, and take the second distance as the target distance, wherein the first weight is greater than the second weight.

In one embodiment, the aforesaid quality quantization processing module is specifically configured to: take the composition quality quantization value of the video frame as a preset composition quality quantization value when the output result excludes the position information of the target object, wherein the preset composition quality quantization value is related to the composition quality quantization value of at least one video frame including the target object in the video data.

In one embodiment, the aforesaid selecting module includes: a clipping unit, being configured to clip the target video frame according to the position of the target object in the target video frame when the target video frame is a two-dimensional image; and a first selecting unit, being configured to take the clipped target video frame as the cover of the video data.

In one embodiment, the aforesaid selecting module further includes: a second obtaining unit, being configured to obtain, according to the wide-angle type of the target video frame, a rendering strategy corresponding to the wide-angle type when the target video frame is a panoramic image; a rendering unit, being configured to render the target video frame based on the rendering strategy, and take the rendered target video frame as the cover of the video data.

In one embodiment, the aforesaid selecting module further includes: a computing unit, being configured to: calculate a difference between the imaging quality quantization value and the composition quality quantization value of each video frame, and take the difference as a comprehensive quality quantization value of each video frame; a third obtaining unit, being configured to take the video frame with the largest comprehensive quality quantization value among the video frames as the target video frame.

In a third aspect, a computer device is provided, the computer device includes a memory and a processor, the memory stores a computer program, and the processor, when executing the computer program, implements any of the method as described in the aforesaid first aspect.

In a fourth aspect, a computer-readable non-volatile storage medium with a computer program stored thereon is provided, wherein the computer program, when executed by a processor, implements any of the method as described in the aforesaid first aspect.

DETAILED DESCRIPTION

In order to make objectives, technical solutions and advantages of the present application more clear, the present application will be further described in detail with reference to the attached drawings and embodiments. As shall be appreciated, the specific embodiments described herein are only used to explain the present application, and are not intended to limit the present application.

It shall be noted that the executive subject of the video cover selecting method provided according to the embodiments of the present application may be a video cover selecting apparatus, the video cover selecting apparatus may be implemented as part or all of a computer device through software, hardware or a combination of software and hardware, wherein the computer device may be a server or a terminal, and the server in the embodiment of the present application may be one server or a server cluster composed of multiple servers, and the terminal in the embodiment of the present application may be a smart phone, a personal computer, a tablet computer, a wearable device, a children's story machine and an intelligent robot or other intelligent hardware devices. The embodiments of methods described below all take the case where the executive subject is a computer device as an example for illustration.

Figure 1:
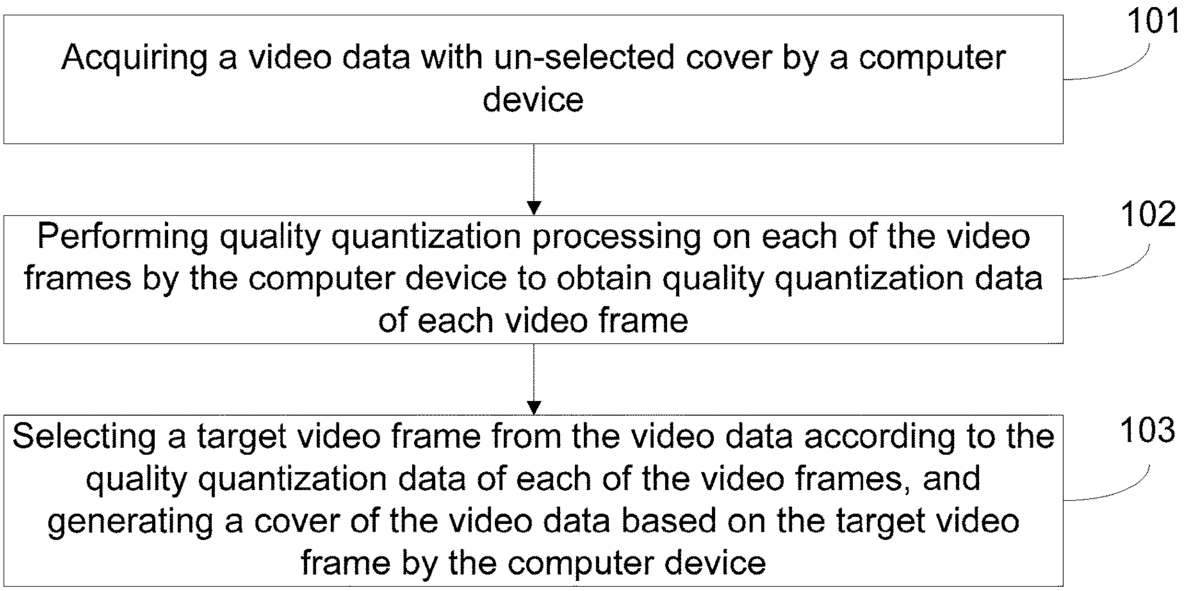
FIG. 1 is a schematic flowchart diagram of a method for video cover selecting according to one embodiment.

In one embodiment of the present application, as shown in FIG. 1, a video cover selecting method is provided, which is illustrated by being applied to the computer device as an example, and the video cover selecting method includes the following steps:

step 101: acquiring a video data with un-selected cover by a computer device.

The video data includes multiple video frames.

Specifically, the computer device may receive the video data with the cover to be selected sent by other computer devices; or extract the video data with the cover to be selected from a database of the computer device itself; or receive the video data with the cover to be selected input by a user. The way in which the computer device acquires the video data with the cover to be selected is not specifically limited in the embodiment of the present application.

step 102: performing quality quantization processing on each of the video frames by the computer device to obtain quality quantization data of each video frame.

The quality quantization data includes at least one of an imaging quality quantization value and a composition quality quantization value. Optionally, the quality quantization data may be a numerical value representing the quality of each of the video frames; for example, the quality quantization data of a video frame is 3.5 points, and the total score corresponding to the quality quantization data is 5 points. Optionally, the quality quantization data may also be a level that represents the quality of each of the video frames; for example, the quality level of a video frame is level 1, and the quality level may be divided into a total of four levels: level 1, level 2, level 3 and level 4, with level 1 being the optimal level; the quality quantization data may also be a numerical value representing the quality ranking of each of the video frames, and it represents the quality ranking of each of the video frames among all the video frames. No specific limitation is made to the quality quantization data in the embodiment of the present application.

Optionally, the computer device may input each of the video frames into a preset neural network model, and the neural network model extracts features of each of the video frames, thereby outputting the quality quantization data of each video frames.

step 103: selecting a target video frame from the video data according to the quality quantization data of each of the video frames, and generating the cover of the video data based on the target video frame by the computer device.

Optionally, when the quality quantization data is a numerical value representing the quality of each of the video frames, the computer device may compare the quality quantization data of each of the video frames, and select a video frame with the highest quality quantization data from the video data as the target video frame, and may use the target video frame as the cover of the video data.

Optionally, when the quality quantization data is a numerical value representing the quality ranking of each of the video frames, the computer device may select a video frame ranking first on the quality ranking from the video data as the target video frame, and may take the target video frame as the cover of the video data.

In the video cover selecting method described above, the computer device acquires video data with un-selected cover, and performs quality quantization processing on each of the video frames to obtain quality quantization data of the video frames. The computer device obtains a target video frame from the video data according to the quality quantization data of each of the video frames, and generates the cover of the video data based on the target video frame. In the above method, the quality of each the video frame can be obtained by performing quality quantization processing on each of the video frames to obtain quality quantization data of the video frames. Since the quality quantization data includes at least one of an imaging quality quantization value and a composition quality quantization value, at least one of imaging quality and composition quality of the target video frame can be guaranteed by selecting the target vide frame according to the quality of each of the video frames and generating the cover of the video data based on the target video frame, which further diversifies the cover selecting method and increases the flexibility of cover selection.

In an optional implementation of the present application, the aforesaid step 102 of "performing quality quantization processing on each of the video frames by the computer device to obtain quality quantization data of the video frames" may include the following content:

inputting each of the video frames into a pre-trained imaging quality prediction model by the computer device to obtain the imaging quality quantization value of each video frame.

The imaging quality quantization value includes at least one of a brightness quality quantization value, a definition quality quantization value, a contrast quality quantization value, a colorfulness quantization value and an aesthetic index quantization value. The higher the imaging quality quantization value is, the closer the video frame is to human aesthetic sensory index.

Specifically, the computer device may input each of the video frames into a pre-trained imaging quality prediction model, and the imaging quality prediction model extracts features of the video frame, and outputs the imaging quality quantization value of the video frame according to the extracted features. The imaging quality quantization value may be a data or a quality level, and no specific limitation is made to the imaging quality quantization value in the embodiment of the present application.

The training process of the imaging quality prediction model may include the following operation: the computer device may receive multiple images sent by other devices, or it may extract multiple images from the database. Manual image quality evaluation is performed on the same image by multiple people, and multiple imaging quality quantization values for the same image are obtained from multiple people, an average of the multiple imaging quality quantization values is obtained, and the average obtained is taken as the imaging quality quantization value corresponding to the image. According to this method, the imaging quality quantization values corresponding to the multiple images are obtained in turn. The multiple images including the imaging quality quantization values are taken as a training sample image set for training the imaging quality prediction model.

When training the above-mentioned imaging quality prediction model, the Adam optimizer or the SGD optimizer may be selected to optimize the imaging quality prediction model, so that the imaging quality prediction model can converge quickly and provide good generalization ability.

Illustratively, the use of the Adam optimizer is taken as an example for illustration. When the Adam optimizer is used to optimize the imaging quality prediction model as described above, a learning rate may also be set for the optimizer; here, the best learning rate may be selected by using the technology of LR Range Test and set for the optimizer. The learning rate selection process of this testing technology is as follows: first the learning rate is set to be a very small value, then the imaging quality prediction model and the training sample image set data are simply iterated for several times, the learning rate is increased after each iteration is completed, and the training loss of each time is recorded, and then an LR Range Test graph is plotted; generally, the ideal LR Range Test graph includes three regions: the learning rate of the first region is too small and the loss is basically unchanged, the loss of the second region decreases and converges quickly, and the learning rate of the last region is too large so that the loss begins to diverge; therefore, the learning rate corresponding to the lowest point in the LR Range Test graph may be taken as the optimal learning rate, and the optimal learning rate may be set to the optimizer as the initial learning rate of the Adam optimizer.

In the embodiment of the present application, the computer device inputs each of the video frames into a pre-trained imaging quality prediction model to obtain the imaging quality quantization value of the video frame. In this way, the imaging quality quantization value obtained for the video frame is more accurate, thereby ensuring that the quality of the cover of the video data is higher.

Figure 2:
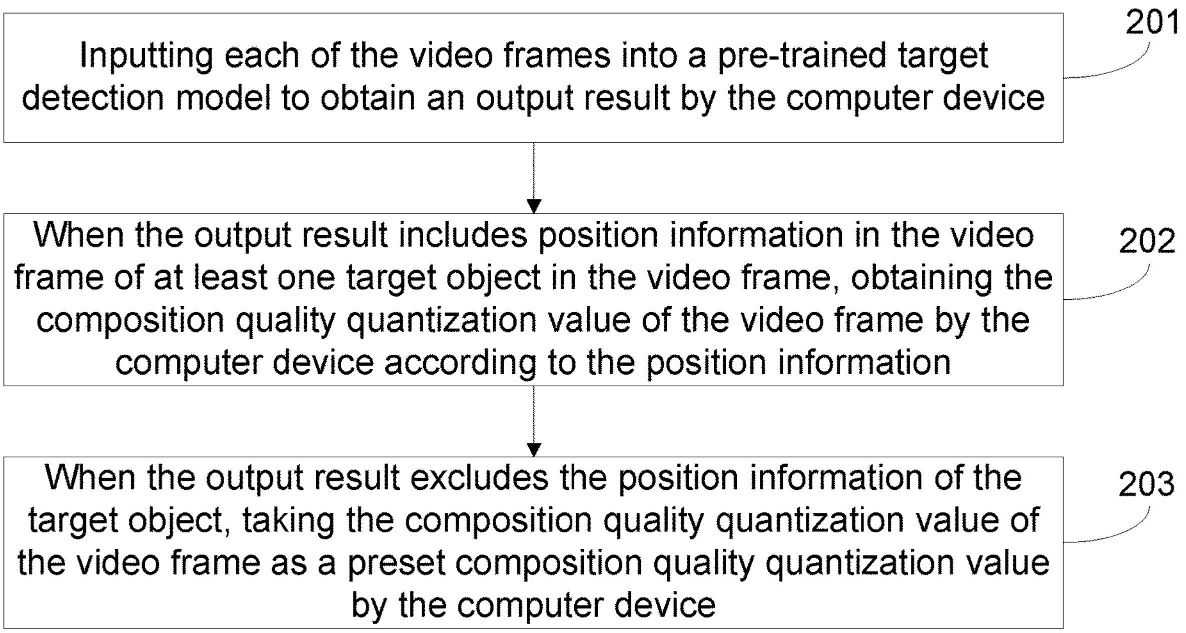
FIG. 2 is a schematic flowchart diagram illustrating steps of video cover selection according to one embodiment.

In an optional implementation of the present application, as shown in FIG. 2, the aforesaid step 102 of "performing quality quantization processing on each of the video frames by the computer device to obtain quality quantization data of each video frames" may further include the following steps:

step 201: inputting each of the video frames into a pre-trained target detection model to obtain an output result by the computer device.

Specifically, a computer device inputs the video frame into a pre-trained target detection model, and the target detection model extracts features of the video frame and obtains an output result according to the extracted features. The target detection model may be a model based on manual features, such as a Deformable Parts Model (DPM), and the target detection model may also be a model based on convolutional neural networks, such as You Only Look Once (YOLO), Region-based Convolutional Neural Networks (R-CNN), Single Shot MultiBox (SSD) and Mask Region-based Convolutional Neural Networks (Mask R-CNN) or the like. No specific limitation is made to the target detection model in the embodiment of the present application.

In one case, when the target detection model identifies that the target object is included in the video frame, then the target detection model outputs the position information of the target object in the video frame. The number of target objects may be one or two or multiple. In the embodiment of the present application, no specific limitation is made to the number of target objects identified by the target detection model.

In another case, when no target object is identified by the target detection model in the video frame, which means that the target object is not included in the video frame, then the computer device directly outputs the video frame, that is, the output result excludes the position information of the target object.

step 202: when the output result includes position information in the video frame of at least one target object in the video frame, obtaining the composition quality quantization value of the video frame by the computer device according to the position information.

Specifically, when the output result includes the position information in the video frame of at least one target object in the video frame, then it means that the video frame contains at least one target object, and the computer device obtains the position of the target object in the video frame according to the position information of the target object, thereby acquiring the composition quality quantization value of the video frame.

step 203: when the output result excludes the position information of the target object, obtaining the composition quality quantization value of the video frame as a preset composition quality quantization value by the computer device.

Specifically, when the output result excludes the position information of the target object, then it means that the target object is not included in the video frame, and the computer device does not need to obtain the position of the target object in the video frame. The computer device takes a preset composition quality quantization value as the composition quality quantization value of the video frame.

The preset composition quality quantization value is related to the composition quality quantization value of at least one video frame including the target object in the video data.

Optionally, the preset composition quality quantization value may be decided according to an average of composition quality quantization values of other video frames containing the target object, or it may be decided according to a median value of composition quality quantization values of other video frames containing the target object.

In the embodiment of the present application, the computer device inputs each of the video frames into a pre-trained target detection model to obtain the output result. In this way, the accuracy of identifying the position information of the target object in the video frame is guaranteed, when the output result includes the position information in the video frame of at least one target object in the video frame, the computer device obtains the composition quality quantization value of the video frame according to the position information, when the output result excludes the position information of the target object, the computer device takes the composition quality quantization value of the video frame as a preset composition quality quantization value. In this way, it is unnecessary to calculate the composition quality quantization value of the video frame that excludes the target object, which saves time and improves efficiency.

Figure 3:
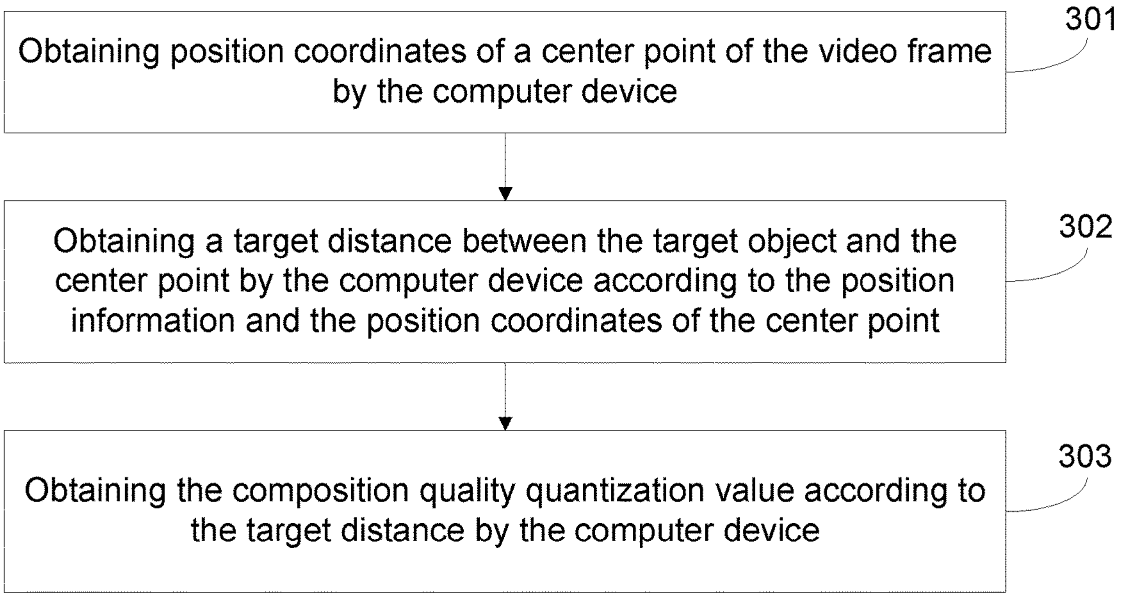
FIG. 3 is a schematic flowchart diagram of a method for video cover selecting according to another embodiment.

In an optional implementation of the present application, as shown in FIG. 3, the aforesaid step 202 of "obtaining the composition quality quantization value of the video frame by the computer device according to the position information" may include the following steps:

step 301: obtaining a position coordinate of a center point of the video frame by the computer device.

Specifically, the computer device obtains the number of pixels in the horizontal direction and the number of pixels in the longitudinal direction in a video frame, and obtains the position coordinates of the center point of the video frame according to the number of pixels in the horizontal direction and the number of pixels in the longitudinal direction.

step 302: obtaining a target distance between the target object and the center point by the computer device according to the position information and the position coordinates of the center point.

In the embodiment of the present application, the computer device may obtain the position coordinates of the target object according to the position information of the target object. Optionally, the computer device may obtain the position coordinates of the center point of the target object according to the position information of the target object, and take the position coordinates of the center point of the target object as the position coordinates of the target object. Optionally, the computer device may also obtain the position coordinates of a certain preset edge point of the target object according to the position information of the target object, and take the position coordinates of the preset edge point as the position coordinates of the target object.

For example, when the target object is a person, then the preset edge point may be the left eye, the right eye, and the mouth or the like.

After obtaining the position coordinates of the target object, the computer device may calculate the target distance between the target object and the center point through the position coordinates of the target object and the position coordinates of the center point.

Illustratively, the computer device may calculate the target distance between the target object and the center point according to the following equation:

$$d=(x-x_c)^2+(y-y_c)^2;$$

wherein p(x,y) represents the position coordinates of the target object, o($x_c$,$y_c$) represents the position coordinates of the center point, and d represents the target distance between the target object and the center point.

Optionally, in order to avoid excessive deviation generated for the target object near the central area of the image, remapping may also be performed by an exponential function, and the target distance between the target object and the center point may be specifically calculated by the following equation:

$$d=e(x-x_c)^2+(y-y_c)^2$$

wherein p(x,y) represents the position coordinates of the target object, o($x_c$,$y_c$) represents the position coordinates of the center point, and d represents the target distance between the target object and the center point.

It shall be appreciated that there are many other ways to calculate the target distance between the target object and the center point through the position coordinates of the target object and the position coordinates of the center point, which are not limited to the methods listed above, and no limitation is made to the specific calculation methods herein.

step 303: obtaining the composition quality quantization value according to the target distance by the computer device.

Specifically, the smaller the target distance is, the closer the target object is to the center point, and the smaller the composition quality quantization value of the video frame is, the better the composition quality of the video frame will be.

In the case where there is only one target object in the video frame, optionally, the computer device may take the target distance between the position coordinates of the target object and the position coordinates of the center point as the composition quality quantization value; optionally, the computer device may also multiply the target distance between the position coordinates of the target object and the position coordinates of the center point by a first preset weight, and take the target distance multiplied by the first preset weight as the composition quality quantization value.

It shall be noted that in the case where there is only one target object in the video frame, there are many ways for the computer device to calculate the composition quality quantization value according to the target distance between the position coordinates of one target object and the position coordinates of the center point, which are not limited to the methods listed above.

In the case where there are multiple target objects in the video frame, optionally, the computer device may perform summing operation on the target distances between the position coordinates of multiple target objects and the position coordinates of the center point, and it may take the numerical value obtained after the summing operation as the composition quality quantization value. Optionally, the computer device may also perform summing operation on the target distances between the position coordinates of multiple target objects and the position coordinates of the center point, and multiply the numerical value obtained after the summing operation by a second preset weight, and take the numerical value obtained after multiplying the value by the second preset weight as the composition quality quantization value. Optionally, the computer device may also perform an averaging operation on the target distances between the position coordinates of multiple target objects and the position coordinates of the center point, and it may take the numerical value obtained after the averaging operation as the composition quality quantization value. Optionally, the computer device may also perform an averaging operation on the target distances between the position coordinates of multiple target objects and the position coordinates of the center point, and multiply the numerical value obtained after the averaging operation by a third preset weight, and take the numerical value obtained after multiplying the value by the third preset weight as the composition quality quantization value. Optionally, the computer device may also multiply the target distances between the position coordinates of multiple target objects and the position coordinates of the center point by different preset weights respectively followed by summing them up, and take the numerical value obtained by the above operation as the composition quality quantization value.

It shall be noted that in the case where there are multiple target objects in the video frame, there are many ways for the computer device to calculate the composition quality quantization value according to the target distance between the position coordinates of multiple target objects and the position coordinates of the center point, which are not limited to the methods listed above.

In the embodiment of the present application, the computer device obtains the position coordinates of the center point of the video frame. According to the position information of the target object, the computer device calculates the target distance between the target object and the center point according to the position information and the position coordinates of the center point, and obtains the composition quality quantization value according to each target distance. By the aforesaid method, the computer device can quickly and accurately obtain the position in the video frame of each target object in the video frame, and calculate the composition quality quantization value of the video frame according to each target distance, thereby ensuring the accuracy of the composition quality quantization value of the video frame.

Figure 4:
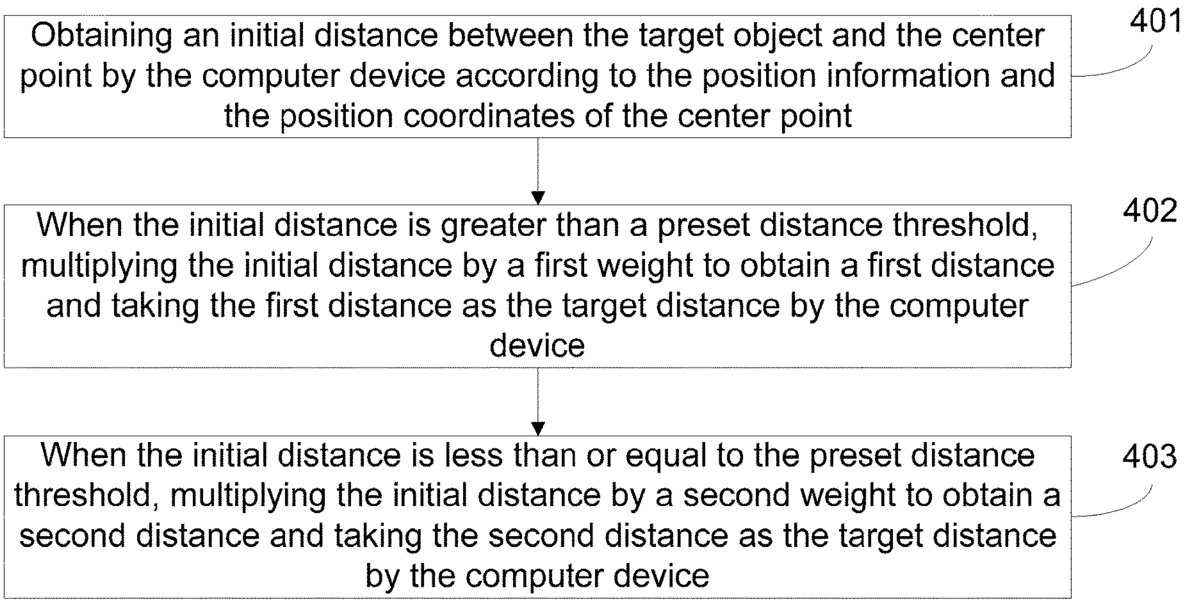
FIG. 4 is a schematic flowchart diagram of a method for video cover selecting according to another embodiment.

In an optional embodiment of the present application, as shown in FIG. 4, the aforesaid step 302 of "obtaining a target distance between the target object and the center point by the computer device according to the position information and the position coordinates of the center point" may include the following steps:

step 401: obtaining an initial distance between the target object and the center point by the computer device according to the position information and the position coordinates of the center point.

Specifically, the computer device may obtain the position coordinates of the target object according to the position information of the target object. Optionally, the computer device may obtain the position coordinates of the center point of the target object according to the position information of the target object, and take the position coordinates of the center point of the target object as the position coordinates of the target object. Optionally, the computer device may also obtain position coordinates of a certain preset edge point of the target object according to the position information of the target object, and take the position coordinates of the preset edge point as the position coordinates of the target object. For example, when the target object is a person, then the preset edge point may be the left eye, or the right eye, or the mouth or the like.

After obtaining the position coordinates of the target object, the computer device may calculate the initial distance between the target object and the center point through the position coordinates of the target object and the position coordinates of the center point.

Illustratively, the computer device may calculate the initial distance between the target object and the center point according to the following equation:

$$d=(x-x_c)^2+(y-y_c);$$

wherein p(x,y) represents the position coordinates of the target object, $o(x_c,y_c)$ represents the position coordinates of the center point, and d represents the initial distance between the target object and the center point.

Optionally, in order to avoid excessive deviation generated for the target object near the central area, remapping may also be performed by an exponential function, and the initial distance between the target object and the center point may be specifically calculated by the following equation:

$$d=e^{(x-x_c)^2+(y-y_c)^2}$$

wherein p(x,y) represents the position coordinates of the target object, $o(x_c,y_c)$ represents the position coordinates of the center point of the video frame, and d represents the initial distance between the target object and the center point.

It shall be appreciated that there are many other ways to calculate the initial distance between the target object and the center point through the position coordinates of the target object and the position coordinates of the center point, which are not limited to the methods listed above, and no limitation is made to the specific calculation methods herein.

step 402: when the initial distance is greater than a preset distance threshold, multiplying the initial distance by a first weight to obtain a first distance and taking the first distance as the target distance by the computer device.

In order to make the finally calculated target distance better represent the composition quality quantization data of the video frame, computer device may multiply the calculated initial distance by the corresponding weight, and then take the numerical value calculated as the target distance of the corresponding target object, when the initial distance is greater than the preset distance threshold, then it means that the corresponding target object is far from the center of the image; at this point, the first weight may be set to be a numerical value greater than 1, so that the initial distance is much greater than the target distance of the target object corresponding to the preset threshold, and at this point, a larger composition quality quantization value is obtained for the corresponding video frame because the target object deviates from the center of the image, which means that the composition quality of the corresponding video frame is worse.

Illustratively, in a first video frame, two target objects are included, wherein the initial distance between the position coordinates of one target object and the position coordinates of the center point is a distance of 60 pixels, and the initial distance between the position coordinates of the other target object and the position coordinates of the center point is a distance of 50 pixels; in the case where the first weight is not provided, the initial distance of the target object at this point is the corresponding target distance thereof, and if the computer device takes the sum of the target distances between each of the target objects and the center point as the composition quality quantization value of the video frame, then the composition quality quantization value corresponding to the video frame is 110.

In a second video frame, only one target object is included, the initial distance between the target object and the position coordinates of the center point o is a distance of 110 pixels, which is set to be the same as the first video frame, and in the case where the first weight is not provided, the composition quality quantization value corresponding to the video frame is 110.

As can be seen from the above description, the composition quality quantization values corresponding to the above two frames of images are all 110, but the composition quality of the first video frame is obviously better than that of the second video frame because the two target objects in the first video frame are all closer to the central position of the image; however, according to the above algorithm, it cannot be accurately concluded that the composition quality of the first video frame is obviously better than that of the second video frame.

Therefore, in order to enable the computer device to better decide the composition quality quantization value of the video frames according to the target distance, and to enable the obtained composition quality quantization value to be more accurate and better represent the composition quality of the video frame, the first weight may be set to be a numerical value greater than 1, when the initial distance is greater than the preset distance threshold.

Illustratively, still taking the first video frame and the second video frame described above as examples, it is assumed that the preset distance threshold is a distance of 100 pixels, and when the initial distance is greater than the distance of 100 pixels, then the computer device multiplies the initial distance by a first weight which is set to be 2; when the computer device take the sum of the distances between each of the target objects and the center point as the composition quality quantization value of the video frame, then according to the target distance, the composition quality quantization value of the first video frame is calculated to be 110, and the composition quality quantization value of the second video frame is calculated to be 220; at this point, by comparing the composition quality quantization values of the first video frame and the second video frame, it can be accurately concluded that the composition quality of the first video frame is obviously better than that of the second video frame.

step 403: when the initial distance is less than or equal to the preset distance threshold, multiplying the initial distance by a second weight to obtain a second distance and taking the second distance as the target distance by the computer device.

The first weight is greater than the second weight.

In order to make the finally calculated target distance better represent the composition quality quantization value of the video frame, the computer device may multiply the initial distance calculated by the corresponding weight, and then take the numerical value calculated as the target distance of the corresponding target object. When the initial distance is less than or equal to the preset distance threshold, then it means that the corresponding target object is closer to the center of the image, and at this point, the second weight may be set to be a numerical value less than 1 so that the initial distance is much less than the target distance of the target object corresponding to the preset threshold; at this point, a smaller composition quality quantization value is obtained for the corresponding video frame because the target object is close to the center of the image, which means the composition quality of the corresponding video frame is better.

Specifically, after calculating the initial distance, the computer device compares the initial distance with a preset distance threshold, and When the initial distance is less than or equal to the preset distance threshold, then the computer device multiplies the initial distance by a second weight to obtain a second distance, and takes the second distance as the target distance.

Illustratively, in a third video frame, two target objects are included, wherein the initial distance between the position coordinates of one target object and the position coordinates of the center point is a distance of 50 pixels, and the initial distance between the position coordinates of the other target object and the position coordinates of the center point is a distance of 110 pixels; in the case where the first weight and the second weight are not provided, the initial distance of the target object at this point is the corresponding target distance thereof, and if the computer device takes an average of the target distances between each of the target objects and the center point as the composition quality quantization value of the video frame, then the composition quality quantization value corresponding to the video frame is 80.

A fourth video frame also includes two target objects therein, wherein the initial distance between the position coordinates of one target object and the position coordinates of the center point of the video frame is a distance of 70 pixels, and the initial distance between the position coordinates of the other target object and the position coordinates of the center point is a distance of 90 pixels, which is set to be the same as the third video frame, and in the case where the first weight and the second weight are not provided, the composition quality quantization value corresponding to the video frame is 80. As can be seen from the above description, the composition quality quantization values corresponding to the above two frames of images are all 80, but the composition quality of the fourth video frame is obviously better than that of the third video frame because one of the two target objects in the third video frame is closer to the central position of the image and the other is farther away from the central position of the image, while the two target objects in the fourth video frame are all closer to the central position of the image; however, according to the above algorithm, it cannot be accurately concluded that the composition quality of the fourth video frame is obviously better than that of the third video frame.

Therefore, in order to enable the computer device to better decide the composition quality quantization value of the video frames according to the target distance, and to enable the obtained composition quality quantization value to be more accurate and better represent the composition quality of the video frame, the first weight may be set to be a numerical value greater than the second weight.

Illustratively, still taking the third video frame and the fourth video frame described above as examples, it is assumed that the preset distance threshold is a distance of 100 pixels, and when the initial distance is greater than the distance of 100 pixels, then the computer device multiplies the initial distance by a first weight which is set to be 2; when the initial distance is less than or equal to the distance of 100 pixels, then the computer device multiplies the initial distance by a second weight which is set to be 0.5. In the case where the first weight and the second weight are provided, the computer device multiplies the initial distance corresponding to the first target object in the third video frame by 0.5 to obtain a corresponding target distance of 25 pixels, and multiply the initial distance corresponding to the other target object by 2 to obtain a corresponding target distance of 220 pixels; when the computer device takes an average of the target distances between each of the target objects and the center point of the image as the composition quality quantization value of the video frame, then the composition quality quantization value of the third video frame is finally calculated to be 122.5 according to the target distance. According to the same setting as the third video frame, the computer device multiplies the initial distance corresponding to the first target object in the fourth video frame by 0.5, and multiplies the initial distance corresponding to the other target object also by 0.5, and finally calculates the composition quality quantization value of the fourth video frame to be 40 according to the target distance. At this point, it can be accurately concluded that the composition quality of the fourth video frame is obviously better than that of the third video frame by comparing the composition quality quantization value of the third video frame with the composition quality quantization value the fourth video frame.

In the embodiment of the present application, the computer device obtains the initial distance between the target object and the center point according to the position information and the position coordinates of the center point, when the initial distance is greater than a preset distance threshold, the computer device multiplies the initial distance by a first weight to obtain a first distance, and takes the first distance as a target distance, when the initial distance is less than or equal to the preset distance threshold, the initial distance is multiplied by a second weight to obtain a second distance, and the second distance is taken as the target distance. In this way, the difference between the target distances is decreased when the initial distance is less than or equal to the preset distance threshold; and the difference between the target distances is increased when the initial distance is greater than the preset distance threshold. Therefore, the obtained target distance can better represent the position of each of the target objects in the video frame, and the composition quality quantization value of each of the video frames calculated according to each target distance is more accurate.

In an optional embodiment of the present application, the above step 103 of "generating a cover of the video data based on the target video frame" may include the following cases.

In one of the cases, when the target video frame is a two-dimensional image, then the computer device clips the target video frame according to the position in the target video frame of the target object in the target video frame; and takes the clipped target video frame as the cover of the video data.

Specifically, in the case where the target video frame is a two-dimensional image, the computer device clips the target video frame according to the position in the target video frame of the target object in the target video frame and the proportion of the target object in the target video frame.

Illustratively, when the position of the target object in the target video frame is to the right, then the computer device will correspondingly clip the left side of the target video frame; and when the position of the target object is at the upper side of the target video frame, then the computer device will correspondingly clip the lower side of the target video frame.

When the target object accounts for a small proportion in the target video frame, then in order to increase the proportion of the target object in the video frame, the computer device may adaptively clip the periphery of the target video frame.

Optionally, when the target video frame is a two-dimensional image and the target object is not included in the target video frame, then the computer device takes the target video frame as the cover of the video data.

In another case, when the target video frame is a panoramic image, then the computer device takes the rendered target video frame as the cover of the video data according to a preset rendering mode.

Optionally, in the case where the target video frame is a panoramic image, the computer device may obtain the rendering mode of the target video frame according to a preset display mode. The rendering mode may be wide-angle rendering, ultra-wide-angle rendering and so on. Optionally, when the rendering mode corresponding to the target video frame is wide-angle rendering, then the computer device renders the target video frame as a wide-angle image centered on the target object; and when the rendering mode corresponding to the target video frame is super-wide-angle rendering, then the computer device renders the target video frame as a super-wide-angle image centered on the target object.

Optionally, in the case where the target video frame is a panoramic image, the computer device may identify the rendering mode of the target video frame through a preset algorithm model, wherein the rendering mode may be wide-angle rendering, ultra-wide-angle rendering and the like. Optionally, when the rendering mode corresponding to the target video frame is wide-angle rendering, then the computer device renders the target video frame as a wide-angle image centered on the target object; and when the rendering mode corresponding to the target frame video is super wide-angle rendering, then the computer device renders the target video frame as a super wide-angle image centered on the target object.

The training process of the preset algorithm model is as follows: multiple images suitable for wide-angle rendering and ultra-wide-angle rendering are acquired and marked as wide-angle rendering or ultra-wide-angle rendering respectively, and then these marked images are input into an untrained preset algorithm model so that the corresponding rendering mode for each of the images is output.

Optionally, when the target video frame is a panoramic image, and the target video frame includes the target object, then the computer device renders the target video frame according to a preset rendering mode, and takes the rendered image centered on the target object as the cover of the video data.

Optionally, when the target video frame is a panoramic image, and the target video frame excludes the target object, then the computer device may directly render the target video frame according to the preset rendering mode, and take the rendered image as the cover of the video data.

In the embodiment of the present application, when the target video frame is a two-dimensional image, then the computer device clips the target video frame according to the position in the target video frame of the target object in the target video frame and takes the clipped target video frame as the cover of the video data; and when the target video frame is a panoramic image, then the computer device renders the target video frame according to a preset rendering mode, and takes the rendered image as the cover of the video data. In this way, the quality of the cover image is better and the cover image is more beautiful.

Figure 5:
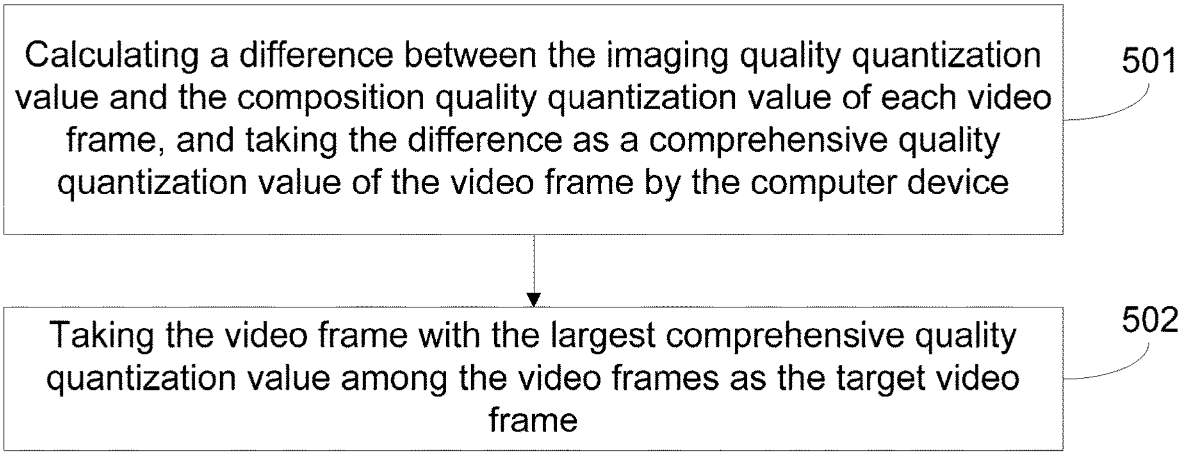
FIG. 5 is a schematic flowchart diagram of a method for video cover selecting according to another embodiment.

In an optional embodiment of the present application, the quality quantization data includes an imaging quality quantization value and a composition quality quantization value, and as shown in FIG. 5, the above step 103 of "selecting a target video frame from the video data by the computer device according to the quality quantization data of each of the video frames" may include the following steps:

step 501: for each of the video frames, calculating a difference between the imaging quality quantization value and the composition quality quantization value corresponding to the video frame, and taking the difference as a comprehensive quality quantization value of the video frame by the computer device.

Optionally, the imaging quality quantization value represents the imaging quality of each of the video frames, and the higher the imaging quality quantization value is, the better the image quality of each of the video frames will be. The composition quality quantization value is calculated according to the target distance between the position of each of the target objects and the position of the center point in each of the video frames, and the lower the composition quality quantization value is, the closer each target object is to the center point, and the better the composition quality of the image will be. In order to make the cover of video data have both good imaging quality and composition quality, for each of the video frames, the computer device may subtract the composition quality quantization value from the imaging quality quantization value corresponding to the video frame to obtain the difference between the imaging quality quantization value and the composition quality quantization value, and take the difference as the comprehensive quality quantization value of the video frame.

Optionally, the computer device may also set different or same weight parameters for the imaging quality quantization value and the composition quality quantization value according to requirements of users, and then calculate the difference between the weighted imaging quality quantization value and composition quality quantization value, and take the difference as the comprehensive quality quantization value of the video frame.

step 502: taking the video frame with the largest comprehensive quality quantization value among the video frames as the target video frame.

Specifically, the computer device may sort the comprehensive quality quantization values of the video frames, and select the video frame with the largest comprehensive quality quantization value from the video data as the target video frame according to the sorting result.

In the embodiment of the present application, for each of the video frames, the computer device calculates the difference between the imaging quality quantization value and the composition quality quantization value corresponding to the video frame, and takes the difference as the comprehensive quality quantization value of the video frame. The computer device takes the video frame with the largest comprehensive quality quantization value among the video frames as the target video frame. In this way, both the imaging quality of the target video frame and the composition quality of the target video frame are guaranteed so that the target video is more beautiful.

Figure 6:
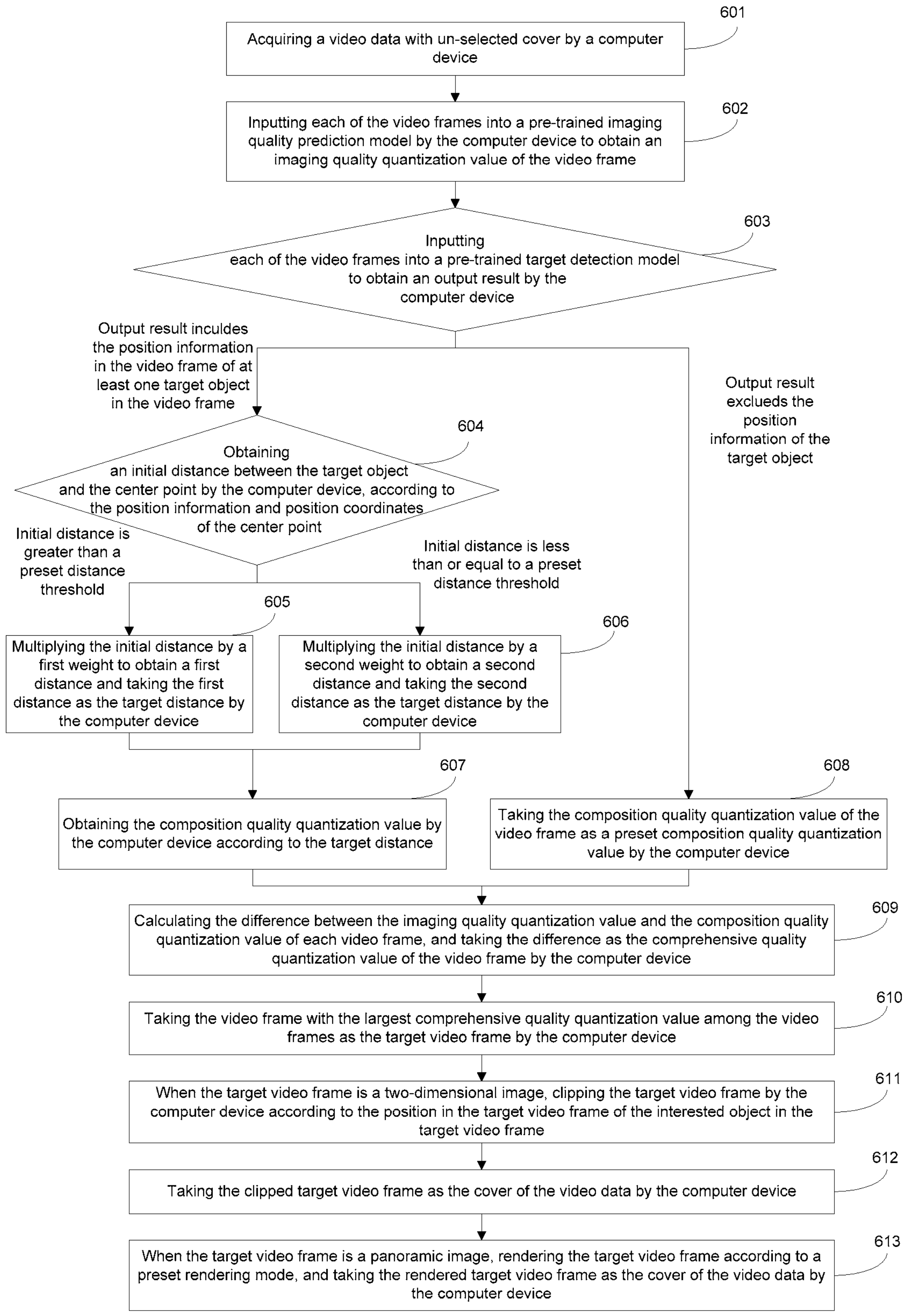
FIG. 6 is a schematic flowchart diagram of a method for video cover selecting according to another embodiment.

In order to better illustrate the video cover selecting method provided according to the present application, the present application provides an embodiment to explain the overall flow of the video cover selecting method, and as shown in FIG. 6, the method includes the following steps:

step 601: acquiring video data with un-selected cover by a computer device.

step 602: inputting each of the video frames into a pre-trained imaging quality prediction model by the computer device to obtain an imaging quality quantization value of each video frame.

step 603: inputting each of the video frames into a pre-trained target detection model to obtain an output result by the computer device; executing step 604 when the output result includes the position information in the video frame of at least one target object in the video frame; and executing step 608 when the output result excludes the position information of the target object.

step 604: obtaining an initial distance between the target object and the center point by the computer device according to the position information and position coordinates of the center point, when the initial distance is greater than a preset distance threshold, then step 605 is executed; and when the initial distance is less than or equal to the preset distance threshold, then step 606 is executed.

step 605: multiplying the initial distance by a first weight to obtain a first distance and taking the first distance as the target distance by the computer device.

step 606: multiplying the initial distance by a second weight to obtain a second distance and taking the second distance as the target distance by the computer device.

step 607: obtaining the composition quality quantization value by the computer device according to the target distance.

step 608: taking the composition quality quantization value of the video frame as a preset composition quality quantization value by the computer device.

step 609: calculating the difference between the imaging quality quantization value and the composition quality quantization value of each of the video frames, and taking the difference as the comprehensive quality quantization value of the video frame by the computer device.

step 610: taking the video frame with the largest comprehensive quality quantization value among the video frames as the target video frame by the computer device.

step 611: when the target video frame is a two-dimensional image, clipping the target video frame by the computer device according to the position in the target video frame of the target object in the target video frame.

step 612: taking the clipped target video frame as the cover of the video data by the computer device.

step 613: when the target video frame is a panoramic image, rendering the target video frame according to a preset rendering mode, and taking the rendered target video frame as the cover of the video data by the computer device.

As shall be appreciated, although the steps in the flowchart diagrams of FIG. 1 to FIG. 6 are displayed in sequence as indicated by arrows, these steps are not necessarily executed in sequence as indicated by the arrows. Unless explicitly stated herein, the execution of these steps is not strictly limited in order, and these steps may be executed in other orders. Moreover, at least some of the steps in FIG. 1 to FIG. 6 may include multiple steps or multiple stages, these steps or stages are not necessarily executed at the same time but may be executed at different times, and these steps or stages are not necessarily executed sequentially but may be executed alternately or alternatively with other steps or at least some of the steps or stages in other steps.

Figure 7:
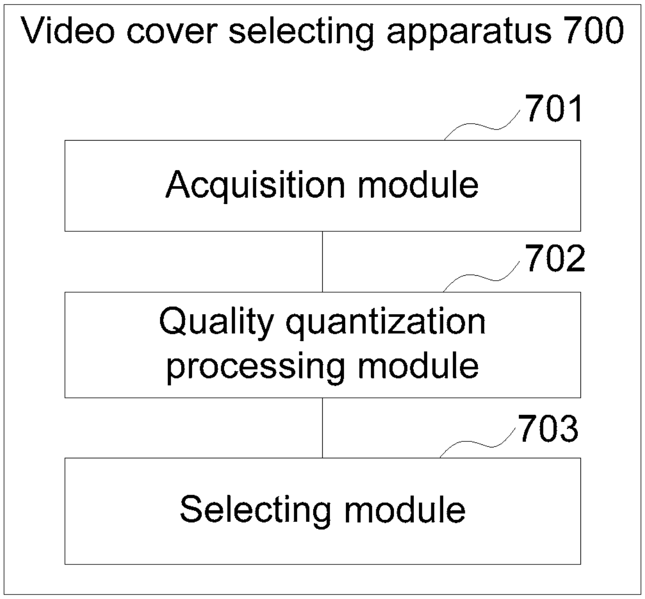
FIG. 7 is a structural block diagram of a video cover selecting apparatus according to one embodiment.

In one embodiment of the present application, as shown in FIG. 7, a video cover selecting apparatus 700 is provided, which includes an acquisition module 701, a quality quantization processing module 702 and a selecting module 703, wherein:

the acquisition module 701 is configured to acquire a video data with un-selected cover, the video data including multiple video frames.

The quality quantization processing module 702 is configured to perform quality quantization processing on each of the video frames to obtain quality quantization data of the video frames, the quality quantization data including at least one of an imaging quality quantization value and a composition quality quantization value.

The selecting module 703 is configured to select a target video frame from the video data according to the quality quantization data of each of the video frames, and generate the cover of the video data based on the target video frame.

In one embodiment of the present application, the above-mentioned quality quantization processing module 702 is specifically configured to: input each of the video frames into a pre-trained imaging quality prediction model to obtain the imaging quality quantization value of each video frame, the imaging quality quantization value including at least one of a brightness quality quantization value, a definition quality quantization value, a contrast quality quantization value, a colorfulness quantization value and an aesthetic index quantization value.

In one embodiment of the present application, the aforesaid quality quantization processing module 702 is specifically configured to: input each of the video frames into a pre-trained target detection model to obtain an output result; when the output result includes position information in the video frame of at least one target object in the video frame, obtain the composition quality quantization value of the video frame according to the position information.

In one embodiment of the present application, the aforesaid quality quantization processing module 702 is specifically configured to: obtain position coordinates of a center point of the video frame; obtain a target distance between the target object and the center point according to the position information and the position coordinates of the center point, and obtain the composition quality quantization value according to the target distance.

In one embodiment of the present application, the aforesaid quality quantization processing module 702 is specifically configured to: obtain an initial distance between the target object and the center point according to the position information and the position coordinates of the center point; multiply the initial distance by a first weight to obtain a first distance when the initial distance is greater than a preset distance threshold, and take the first distance as the target distance; multiply the initial distance by a second weight to obtain a second distance when the initial distance is less than or equal to the preset distance threshold, and take the second distance as the target distance, wherein the first weight is greater than the second weight.

In one embodiment of the present application, the aforesaid quality quantization processing module is specifically configured to: take the composition quality quantization value of the video frame as a preset composition quality quantization value when the output result excludes the position information of the target object, wherein the preset composition quality quantization value is related to the composition quality quantization value of at least one video frame including the target object in the video data.

Figure 8:
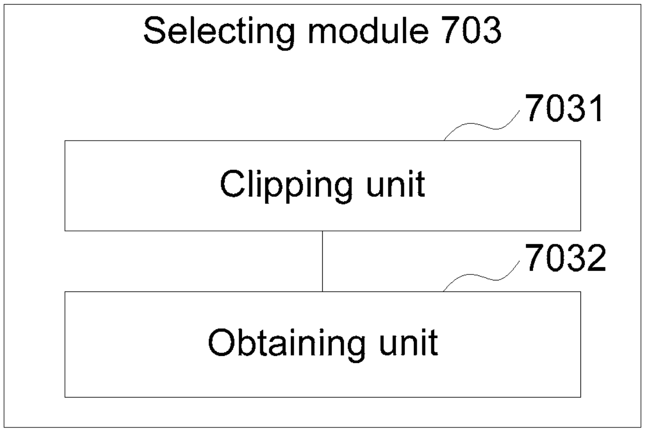
FIG. 8 is a structural block diagram of a video cover selecting apparatus according to one embodiment.

In one embodiment of the present application, as shown in FIG. 8, the aforesaid selecting module 703 includes:

a clipping unit 7031, being configured to clip the target video frame according to the position in the target video frame of the target object in the target video frame when the target video frame is a two-dimensional image;

a first obtaining unit 7032, being configured to take the clipped target video frame as the cover of the video data.

Figure 9:
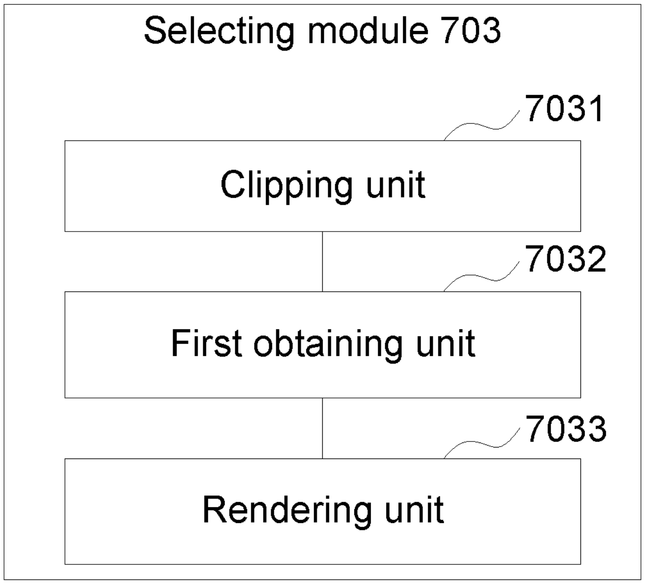
FIG. 9 is a structural block diagram of a video cover selecting apparatus according to one embodiment.

In one embodiment of the present application, as shown in FIG. 9, the aforesaid selecting module 703 further includes:

a rendering unit 7033, being configured to render the target video frame according to a preset rendering mode when the target video frame is a panoramic image, and take the rendered target video frame as the cover of the video data.

Figure 10:
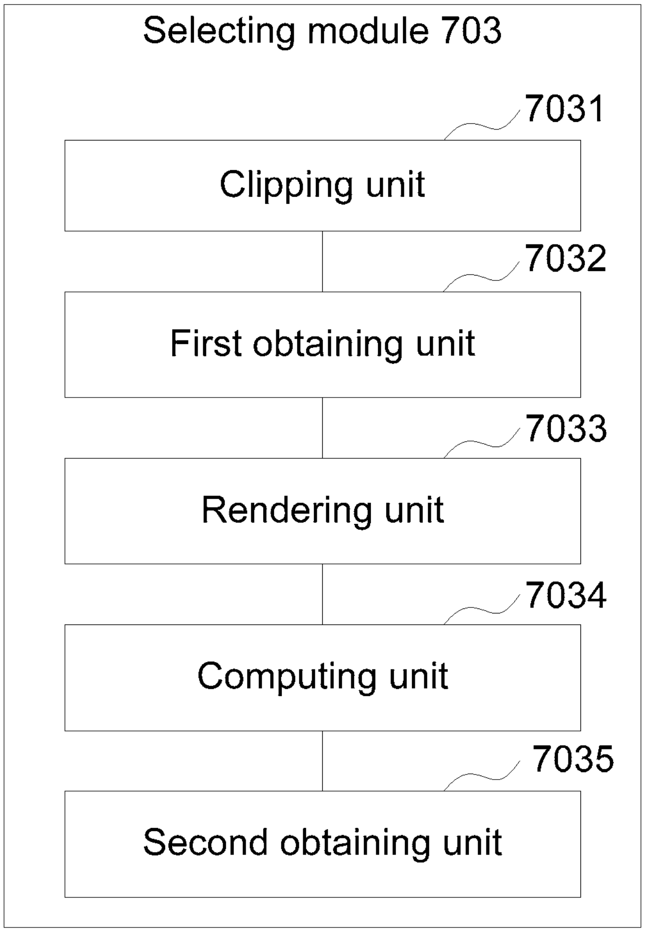
FIG. 10 is a structural block diagram of a video cover selecting apparatus according to one embodiment.

In one embodiment of the present application, as shown in FIG. 10, the aforesaid selecting module 703 further includes:

a computing unit 7034, being configured to: calculate a difference between the imaging quality quantization value and the composition quality quantization value of each video frame, and take the difference as a comprehensive quality quantization value of the video frame;

a second obtaining unit 7035, being configured to take the video frame with the largest comprehensive quality quantization value among the video frames as the target video frame.

Reference may be made to the limitation to the video cover selecting method described above for specific limitation to the video cover selecting apparatus, and this will not be further described herein. Each module in the video cover selecting apparatus described above may be realized in whole or in part by software, hardware and combinations thereof.

The above modules may be embedded in a processor in a computer device in the form of hardware or independent of the processor in the computer device, and these modules may also be stored in a memory in the computer device in the form of software so that they can be conveniently called by the processor to execute the operations corresponding to the above modules.

Figure 11:
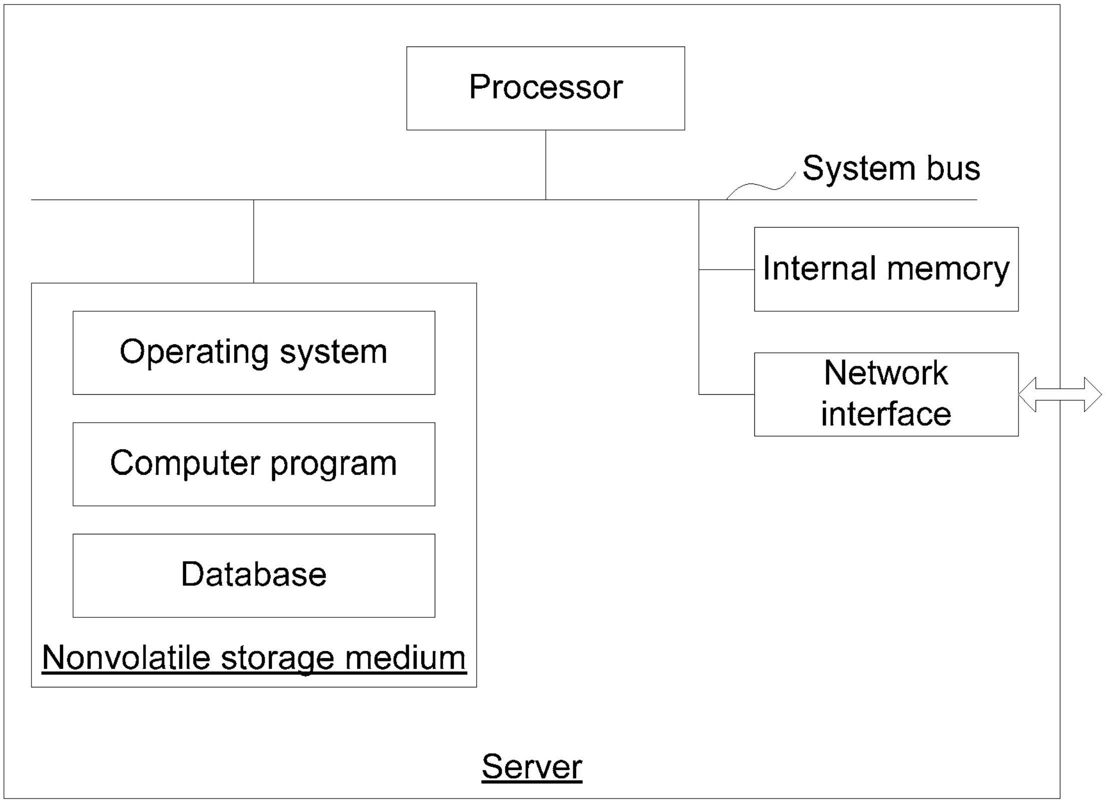
FIG. 11 is an internal structural diagram when a computer device is a server according to one embodiment.

In one embodiment of the present application, a computer device is provided, the computer device may be a server, and when the computer device is a server, the internal structural diagram thereof may be as shown in FIG. 11. The computer device includes a processor, a memory and a network interface connected through a system bus. The processor of the computer device is used for providing computing and control capabilities. The memory of the computer device includes a nonvolatile storage medium and an internal memory. The nonvolatile storage medium stores an operating system, a computer program and a database. The internal memory provides an environment for the operation of the operating system and the computer program in the nonvolatile storage medium. The database of the computer device is used to store video cover selection data. The network interface of the computer device is used to communicate with external terminals through network connection. The computer program, when executed by a processor, implements a video cover selecting method.

Figure 12:
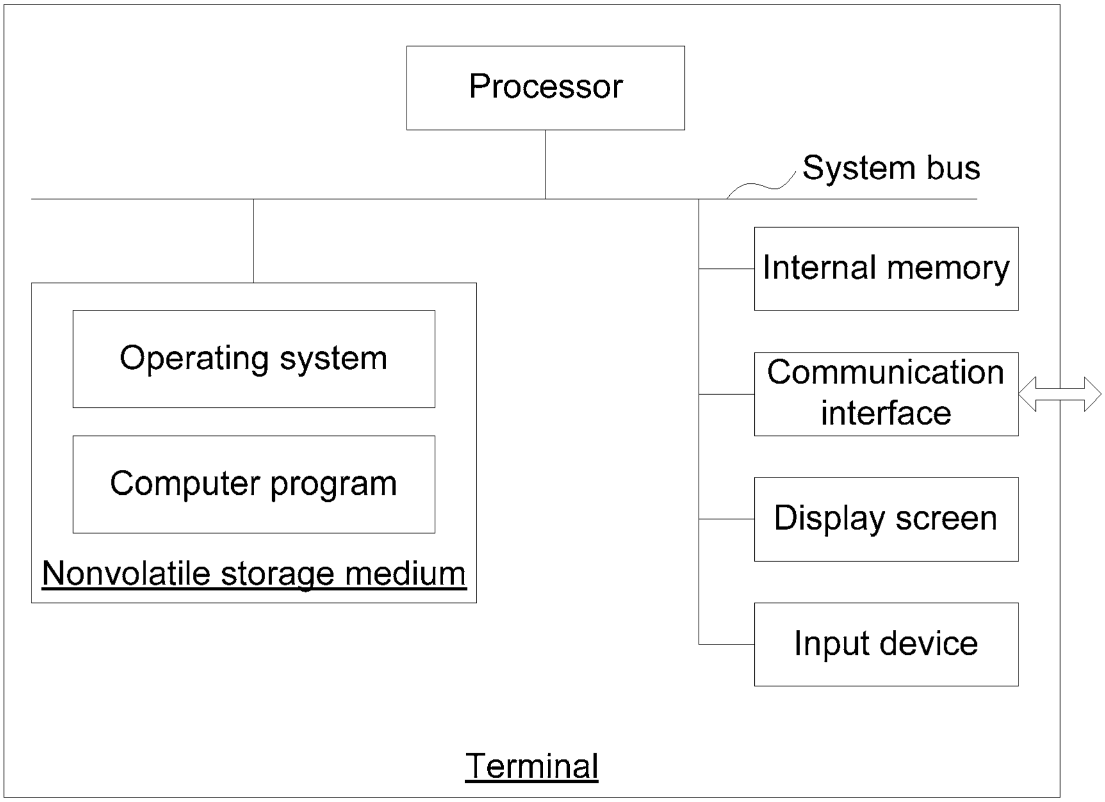
FIG. 12 is an internal structural diagram when the computer device is a terminal according to one embodiment.

In one embodiment, a computer device is provided, the computer device may be a terminal, and when the computer device is a terminal, the internal structural diagram thereof may be as shown in FIG. 12. The computer device includes a processor, a memory, a communication interface, a display screen and an input apparatus connected through a system bus. The processor of the computer device is used for providing computing and control capabilities. The memory of the computer device includes a nonvolatile storage medium and an internal memory. The nonvolatile storage medium stores an operating system and a computer program. The internal memory provides an environment for the operation of the operating system and the computer program in the nonvolatile storage medium. The communication interface of the computer device is used for wired or wireless communication with external terminals, and the wireless communication may be realized by WIFI, operator network, Near Field Communication (NFC) or other technologies. The computer program, when executed by a processor, implements a video cover selecting method. The display screen of the computer device may be a liquid crystal display screen or an electronic ink display screen, and the input apparatus of the computer device may be a touch layer covered on the display screen, or a button, a trackball or a touchpad arranged on the shell of the computer device, or an externally connected keyboard, a touchpad or a mouse or the like.

As shall be appreciated by those skilled in the art, the structures shown in FIG. 11 and FIG. 12 are only block diagrams of a part of structures related to the scheme of the present application, and they do not constitute a limitation on the computer device to which the scheme of the present application is applied, and a specific computer device may include more or less components than those shown in the figure, or include combinations of some components or different component arrangements.

In one embodiment of the present application, a computer device including a memory and a processor is provided, wherein a computer program is stored in the memory, and the processor, when executing the computer program, implements the following steps: acquiring video data with unselected cover, the video data including multiple video frames; performing quality quantization processing on each of the video frames to obtain quality quantization data of the video frames, the quality quantization data including at least one of an imaging quality quantization value and a composition quality quantization value; selecting a target video frame from the video data according to the quality quantization data of each of the video frames, and generating a cover of the video data based on the target video frame.

In one embodiment of the present application, the processor, when executing the computer program, further implements the following steps: inputting each of the video frames into a pre-trained imaging quality prediction model to obtain the imaging quality quantization value of each video frame, the imaging quality quantization value including at least one of a brightness quality quantization value, a definition quality quantization value, a contrast quality quantization value, a colorfulness quantization value and an aesthetic index quantization value.

In one embodiment of the present application, the processor, when executing the computer program, further implements the following steps: inputting each of the video frames into a pre-trained target detection model to obtain an output result; when the output result includes position information in the video frame of at least one target object in the video frame, obtaining the composition quality quantization value of the video frame according to the position information.

In one embodiment of the present application, the processor, when executing the computer program, further implements the following steps: obtaining position coordinates of a center point of the video frame; obtaining a target distance between the target object and the center point according to the position information and the position coordinates of the center point; obtaining the composition quality quantization value according to the target distance.

In one embodiment of the present application, the processor, when executing the computer program, further implements the following steps: obtaining an initial distance between the target object and the center point according to the position information and the position coordinates of the center point; multiplying the initial distance by a first weight to obtain a first distance when the initial distance is greater than a preset distance threshold, and taking the first distance as the target distance; multiplying the initial distance by a second weight to obtain a second distance when the initial distance is less than or equal to the preset distance threshold, and taking the second distance as the target distance, wherein the first weight is greater than the second weight.

In one embodiment of the present application, the processor, when executing the computer program, further implements the following steps: taking the composition quality quantization value of the video frame as a preset composition quality quantization value when the output result excludes the position information of the target object, wherein the preset composition quality quantization value is related to the composition quality quantization value of at least one video frame including the target object in the video data.

In one embodiment of the present application, the processor, when executing the computer program, further implements the following steps: clipping the target video frame according to the position in the target video frame of the target object in the target video frame when the target video frame is a two-dimensional image; and taking the clipped target video frame as the cover of the video data.

In one embodiment of the present application, the processor, when executing the computer program, further implements the following steps: rendering the target video frame according to a preset rendering mode when the target video frame is a panoramic image, and taking the rendered target video frame as the cover of the video data.

In one embodiment of the present application, the quality quantization data includes an imaging quality quantization value and a composition quality quantization value, and the processor, when executing the computer program, further implements the following steps: for each of the video frames, calculating a difference between the imaging quality quantization value and the composition quality quantization value corresponding to the video frame, and taking the difference as a comprehensive quality quantization value of the video frame; taking the video frame with the largest comprehensive quality quantization value among the video frames as the target video frame.

In one embodiment of the present application, a computer-readable storage medium with a computer program stored thereon is provided, and the computer program, when executed by a processor, implements the following steps: acquiring video data with un-selected cover, the video data including multiple video frames; performing quality quantization processing on each of the video frames to obtain quality quantization data of the video frames, the quality quantization data including at least one of an imaging quality quantization value and a composition quality quantization value; selecting a target video frame from the video data according to the quality quantization data of each of the video frames, and generating the cover of the video data based on the target video frame.

In one embodiment of the present application, the computer program, when executed by the processor, further implements the following steps: inputting each of the video frames into a pre-trained imaging quality prediction model to obtain the imaging quality quantization value of each video frame, the imaging quality quantization value including at least one of a brightness quality quantization value, a definition quality quantization value, a contrast quality quantization value, a colorfulness quantization value and an aesthetic index quantization value.

In one embodiment of the present application, the computer program, when executed by the processor, further implements the following steps: inputting each of the video frames into a pre-trained target detection model to obtain an output result; when the output result includes position information in the video frame of at least one target object in the video frame, obtaining the composition quality quantization value of the video frame according to the position information.

In one embodiment of the present application, the computer program, when executed by the processor, further implements the following steps: obtaining position coordinates of a center point of the video frame; obtaining a target distance between the target object and the center point according to the position information and the position coordinates of the center point; obtaining the composition quality quantization value according to the target distance.

In one embodiment of the present application, the computer program, when executed by the processor, further implements the following steps: obtaining an initial distance between the target object and the center point according to the position information and the position coordinates of the center point; multiplying the initial distance by a first weight to obtain a first distance when the initial distance is greater than a preset distance threshold, and taking the first distance as the target distance; multiplying the initial distance by a second weight to obtain a second distance when the initial distance is less than or equal to the preset distance threshold, and taking the second distance as the target distance, wherein the first weight is greater than the second weight.

In one embodiment of the present application, the computer program, when executed by the processor, further implements the following steps: taking the composition quality quantization value of the video frame as a preset composition quality quantization value when the output result excludes the position information of the target object, wherein the preset composition quality quantization value is related to the composition quality quantization value of at least one video frame including the target object in the video data.

In one embodiment of the present application, the computer program, when executed by the processor, further implements the following steps: clipping the target video frame according to the position in the target video frame of the target object in the target video frame when the target video frame is a two-dimensional image; and taking the clipped target video frame as the cover of the video data.

In one embodiment of the present application, the computer program, when executed by the processor, further implements the following steps: rendering the target video frame according to a preset rendering mode when the target video frame is a panoramic image, and taking the rendered target video frame as the cover of the video data.

In one embodiment of the present application, the quality quantization data includes an imaging quality quantization value and a composition quality quantization value, and the computer program, when executed by the processor, further implements the following steps: calculating a difference between the imaging quality quantization value and the composition quality quantization value of each video frame, and taking the difference as a comprehensive quality quantization value of the video frame; taking the video frame with the largest comprehensive quality quantization value among the video frames as the target video frame.

As shall be appreciated by those of ordinary skill in the art, all or part of the processes in the embodiments of the above-mentioned method may be realized by instructing related hardware through a computer program, the computer program may be stored in a nonvolatile computer-readable storage medium, and the computer program, when being executed, may include the processes in the embodiments of the above-mentioned methods. Any reference to memory, storage, database or other media used in the embodiments provided by the present application may include at least one of non-volatile and volatile memories. The non-volatile memory may include a Read-Only Memory (ROM), a magnetic tape, a floppy disk, a flash memory or an optical memory or the like. The volatile memory may include a Random Access Memory (RAM) or an external cache. By way of illustration but not limitation, RAM may be in various forms, such as a Static Random Access Memory (SRAM) or a Dynamic Random Access Memory (DRAM) or the like.

The technical features of the above embodiments may be combined arbitrarily, and in order to make the description concise, not all possible combinations of the technical features in the above embodiments are described; however, the combinations of these technical features shall be considered as within the scope recorded in this specification as long as there is no contradiction therebetween.

The above-mentioned embodiments only express several implementations of the present application which are described specifically and in detail, but these implementations should not be construed as limitation to the scope of patent of the present invention. It shall be noted that for those of ordinary skill in the art, several modifications and improvements can be made without departing from the concept of the present application, and all these modifications and improvements are within the scope claimed in the present application. Therefore, the scope claimed in the patent of the present application shall be governed by the appended claims.

The invention claimed is:

1. A method for selecting a video cover, comprising:

acquiring a video data with un-selected cover, the video data comprising multiple video frames;

performing quality quantization processing on each of the video frames to obtain quality quantization data of each video frame, the quality quantization data comprising an imaging quality quantization value and a composition quality quantization value;

selecting a target video frame from the video data according to the quality quantization data of each of the video frames, and generating a cover of the video data based on the target video frame, wherein the selecting a target video frame from the video data according to the quality quantization data of each of the video frames comprises:

calculating a difference between the imaging quality quantization value and the composition quality quantization value of each video frame, and taking the difference as a comprehensive quality quantization value of each video frame; and taking the video frame with a largest comprehensive quality quantization value among the multiple video frames as the target video frame.

2. The method according to claim 1, wherein the step of performing quality quantization processing on each of the video frames to obtain quality quantization data of each video frame comprises:

inputting each of the video frames into a pre-trained imaging quality prediction model to obtain the imaging quality quantization value of each video frame, the imaging quality quantization value comprising at least one of a brightness quality quantization value, a definition quality quantization value, a contrast quality quantization value, a colorfulness quantization value and an aesthetic index quantization value.

3. The method according to claim 1, wherein the step of performing quality quantization processing on each of the video frames to obtain quality quantization data of each video frame comprises:

inputting each of the video frames into a pre-trained target detection model to obtain an output result;

when the output result comprises a position information of at least one target object in the video frame, obtaining the composition quality quantization value of the video frame according to the position information.

4. The method according to claim 3, wherein the step of obtaining the composition quality quantization value of the video frame according to the position information comprises:

obtaining position coordinates of a center point of the video frame;

obtaining a target distance between the at least one target object and the center point, according to the position information and the position coordinates of the center point;

obtaining the composition quality quantization value according to the target distance.

5. The method according to claim 4, wherein the step of obtaining a target distance between the at least one target object and the center point, according to the position information and the position coordinates of the center point comprises:

obtaining an initial distance between the at least one target object and the center point according to the position information and the position coordinates of the center point;

when the initial distance is greater than a preset distance threshold, multiplying the initial distance by a first weight to obtain a first distance and taking the first distance as the target distance;

when the initial distance is less than or equal to the preset distance threshold, multiplying the initial distance by a second weight to obtain a second distance and taking the second distance as the target distance, wherein the first weight is greater than the second weight.

6. The method according to claim 3, wherein the method further comprises:

when the output result excludes the position information of the at least one target object, taking the composition quality quantization value of the video frame as a preset composition quality quantization value, wherein the preset composition quality quantization value is related to the composition quality quantization value of at least one video frame containing the at least one target object in the video data.

7. The method according to claim 1, wherein the step of generating a cover of the video data based on the target video frame comprises:

when the target video frame is a two-dimensional image, clipping the target video frame according to a position of a target object in the target video frame; and taking the clipped target video frame as the cover of the video data.

8. The method according to claim 1, wherein the step of generating a cover of the video data based on the target video frame comprises:

when the target video frame is a panoramic image, rendering the target video frame according to a preset rendering mode; and taking the rendered target video frame as the cover of the video data.

9. A computer device comprising a memory and a processor, the memory storing a computer program, wherein the processor implements a method for selecting a video cover, when executing the computer program; wherein the method for selecting a video cover comprises following steps:

acquiring a video data with un-selected cover, the video data comprising multiple video frames;

performing quality quantization processing on each of the video frames to obtain quality quantization data of each video frame, the quality quantization data comprising an imaging quality quantization value and a composition quality quantization value;

selecting a target video frame from the video data according to the quality quantization data of each of the video frames, and generating a cover of the video data based on the target video frame, wherein the selecting a target video frame from the video data according to the quality quantization data of each of the video frames comprises:

calculating a difference between the imaging quality quantization value and the composition quality quantization value of each video frame, and taking the difference as a comprehensive quality quantization value of each video frame; and taking the video frame with a largest comprehensive quality quantization value among the multiple video frames as the target video frame.

10. The computer device according to claim 9, wherein the step of performing quality quantization processing on each of the video frames to obtain quality quantization data of each video frame comprises:

inputting each of the video frames into a pre-trained imaging quality prediction model to obtain the imaging quality quantization value of each video frame, the imaging quality quantization value comprising at least one of a brightness quality quantization value, a definition quality quantization value, a contrast quality quantization value, a colorfulness quantization value and an aesthetic index quantization value.

11. The computer device according to claim 9, wherein the step of performing quality quantization processing on each of the video frames to obtain quality quantization data of each video frame comprises:

inputting each of the video frames into a pre-trained target detection model to obtain an output result;

when the output result comprises a position information in the video frame of at least one target object in the video frame, obtaining the composition quality quantization value of the video frame according to the position information.

12. The computer device according to claim 11, wherein the step of obtaining the composition quality quantization value of the video frame according to the position information comprises:

obtaining position coordinates of a center point of the video frame;

obtaining a target distance between the at least one target object and the center point, according to the position information and the position coordinates of the center point;

obtaining the composition quality quantization value according to the target distance.

13. The computer device according to claim 12, wherein the step of obtaining a target distance between the at least one target object and the center point, according to the position information and the position coordinates of the center point comprises:

obtaining an initial distance between the at least one target object and the center point according to the position information and the position coordinates of the center point;

when the initial distance is greater than a preset distance threshold, multiplying the initial distance by a first weight to obtain a first distance and taking the first distance as the target distance;

when the initial distance is less than or equal to the preset distance threshold, multiplying the initial distance by a second weight to obtain a second distance and taking the second distance as the target distance, wherein the first weight is greater than the second weight.

14. The computer device according to claim 11, wherein the method further comprises:

when the output result excludes the position information of the at least one target object, taking the composition quality quantization value of the video frame as a preset composition quality quantization value, wherein the preset composition quality quantization value is related to the composition quality quantization value of at least one video frame containing the at least one target object in the video data.

15. The computer device according to claim 9, wherein the step of generating a cover of the video data based on the target video frame comprises:

when the target video frame is a two-dimensional image, clipping the target video frame according to a position of a target object in the target video frame; and taking the clipped target video frame as the cover of the video data.

16. The computer device according to claim 9, wherein the step of generating a cover of the video data based on the target video frame comprises:

when the target video frame is a panoramic image, rendering the target video frame according to a preset rendering mode; and taking the rendered target video frame as the cover of the video data.

17. A non-transitory computer-readable storage medium with a computer program stored thereon, wherein the computer program, when executed by a processor, implements the steps of a method for selecting a video cover, wherein the method for selecting a video cover comprises following steps:

acquiring a video data with un-selected cover, the video data comprising multiple video frames;

performing quality quantization processing on each of the video frames to obtain quality quantization data of each video frame, the quality quantization data comprising an imaging quality quantization value and a composition quality quantization value;

selecting a target video frame from the video data according to the quality quantization data of each of the video frames, and generating a cover of the video data based on the target video frame, wherein the selecting a target video frame from the video data according to the quality quantization data of each of the video frames comprises:

calculating a difference between the imaging quality quantization value and the composition quality quantization value of each video frame, and taking the difference as a comprehensive quality quantization value of each video frame; and taking the video frame with a largest comprehensive quality quantization value among the multiple video frames as the target video frame.

* * * * *